(12) United States Patent
Pilu

(10) Patent No.: US 6,961,904 B2
(45) Date of Patent: Nov. 1, 2005

(54) DIGITAL IMAGE VIEWING—I

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 10/078,812

(22) Filed: Feb. 19, 2002

(65) Prior Publication Data
US 2002/0126159 A1 Sep. 12, 2002

(30) Foreign Application Priority Data

Mar. 7, 2001 (GB) .............................................. 0105707

(51) Int. Cl.⁷ .............................................. G06F 15/00
(52) U.S. Cl. ........................................ 715/718; 463/41
(58) Field of Search ................................ 715/718, 719, 715/744, 765, 763, 853, 854; 463/41, 42, 40, 43, 44, 47

(56) References Cited

U.S. PATENT DOCUMENTS

| 5,791,992 A | 8/1998 | Crump et al. ................... 463/41 |
| 6,383,080 B1 * | 5/2002 | Link et al. ...................... 463/47 |
| 6,435,969 B1 * | 8/2002 | Tanaka et al. ................. 463/44 |

FOREIGN PATENT DOCUMENTS

| JP | 2000102673 | 1/2000 | ........... A63F/13/00 |
| JP | 2000140422 | 5/2000 | |

OTHER PUBLICATIONS

Internet Websites: hhttp://w w w.icdia.org/related/phocd/pcd-playesr.html: and http://w w w .saturn.bloodflow ers.bloodflowers.org/html/sat_vcd_compat.html dated Jul. 2, 2000.

* cited by examiner

Primary Examiner—Cao (Kevin) Nguyen

(57) ABSTRACT

A system for displaying a user's personal digitized photographic image data in a comparable manner to a photo album is described. The system comprises a combination of: a gaming console for playing a video game; a domestic television for displaying the video game to the user when connected with the console; and a CD including the user's digitized photographic image data and a viewing application program. The viewing application program is arranged to configure the gaming console to display the digitized photographic image data on the television when the CD has been read by the gaming console. The system can be configured to permit simultaneous viewing of the user's image data at remote locations connected by the Internet.

40 Claims, 15 Drawing Sheets

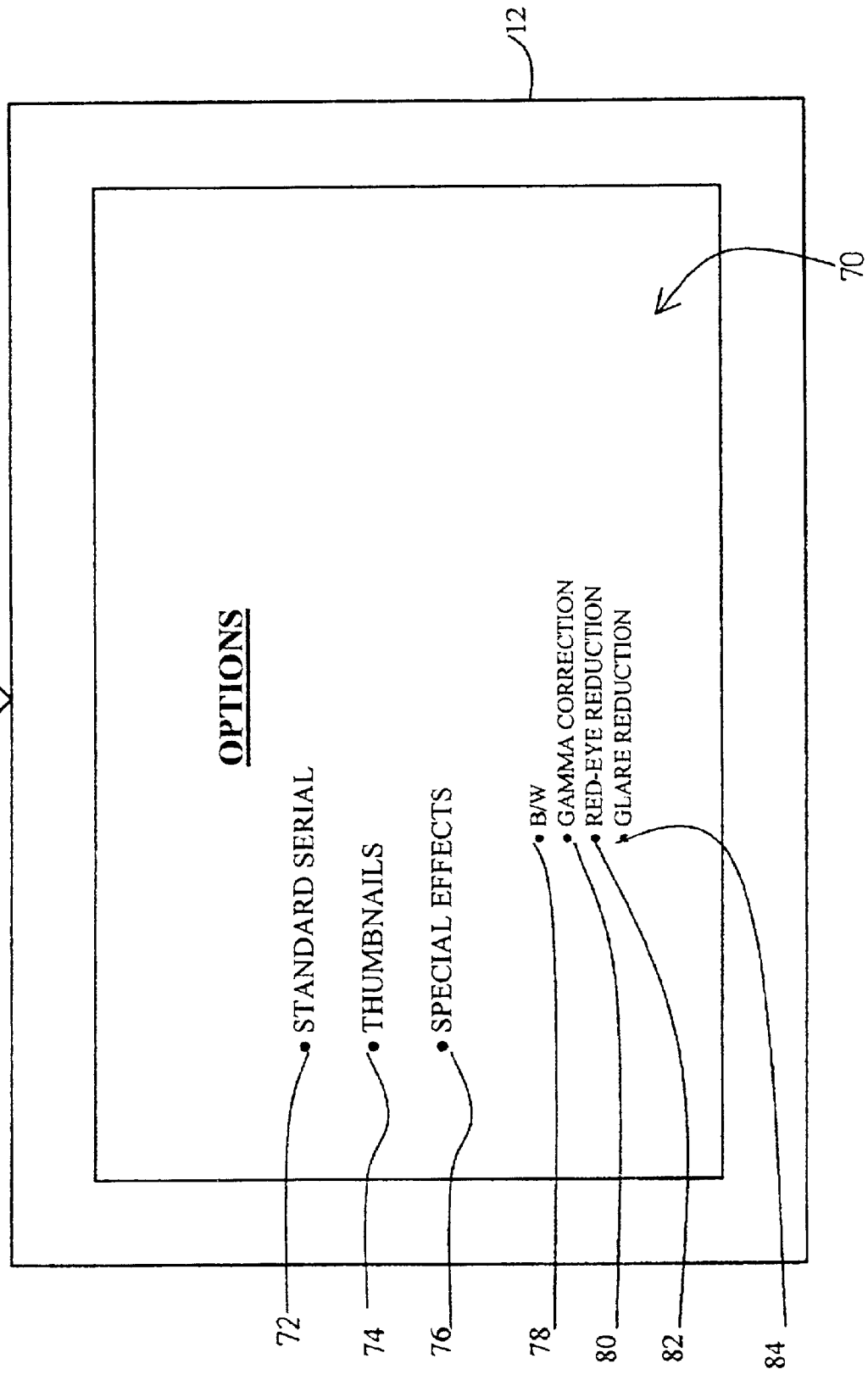

```
┌─────────────────────────────────────────────────────────────┐
│ WHEN ORDERING A CD, WITH A KODAK VIEWING APPLICATION FOR    │
│ EXAMPLE, A CUSTOMER (PERSON A) ALSO REQUESTS THAT A GENERAL │─── 140
│ PURPOSE SHARING APPLET IS INCLUDED AS PART OF THE VIEWING   │
│ APPLICATION BURNT ONTO THE CD.                              │
└─────────────────────────────────────────────────────────────┘
                              │
                              ▼
┌─────────────────────────────────────────────────────────────┐
│ PERSON A ORDERS A FURTHER COPY (OR MORE) OF THE CD WHICH IS │
│ TO BE FORWARDED TO PERSON B WHO ALSO HAS A GAMING CONSOLE   │─── 142
│ WITH AN INTERNET CONNECTION AND A TELEVISION                │
└─────────────────────────────────────────────────────────────┘
                              │
                              ▼
┌─────────────────────────────────────────────────────────────┐
│ PERSON A SUBSEQUENTLY RECEIVES THEIR CD AND THE OTHER EXACT │─── 144
│ COPY IS FORWARDED TO PERSON B                               │
└─────────────────────────────────────────────────────────────┘
                              │
                              ▼
┌─────────────────────────────────────────────────────────────┐
│ WHEN PERSON B RECEIVES THE CD THEY CONTACT PERSON A BY      │─── 146
│ TELEPHONE TO LET THEM KNOW THEY WOULD LIKE TO SEE THE IMAGES│
└─────────────────────────────────────────────────────────────┘
                              │
                              ▼
┌─────────────────────────────────────────────────────────────┐
│ BOTH PARTIES TURN ON THEIR GAMING CONSOLES AND PLACE THEIR  │─── 148
│ RESPECTIVE CDs INTO THE CD DRIVE BAY ON THEIR GAMING CONSOLE│
└─────────────────────────────────────────────────────────────┘
                              │
                              ▼
┌─────────────────────────────────────────────────────────────┐
│ THE SHARING APPLETS ON THE CDs ARE ACTIVATED CAUSING THE    │
│ DIGITAL IMAGES ON THE CDs TO APPEAR ON EACH PARTY'S         │─── 150
│ TELEVISION SCREEN ALLOWING THEM TO ENJOY THE IMAGES TOGETHER│
└─────────────────────────────────────────────────────────────┘
                              │
                              ▼
┌─────────────────────────────────────────────────────────────┐
│ THE PARTIES TALK THROUGH THE IMAGES OVER THE TELEPHONE AND  │
│ POINTER COMMANDS ARE SENT VIA THE INTERNET WHICH ALLOWS     │
│ EITHER PARTY TO INDICATE A PARTICULAR PERSON OR OBJECT IN   │
│ ONE OF THE IMAGES USING THEIR GAMING PAD. THE POINTER       │─── 152
│ COMMAND IS TRANSMITTED TO THE OTHER PARTY'S SCREEN AND BOTH │
│ PARTIES WILL KNOW EXACTLY WHO OR WHAT IS BEING DISCUSSED    │
└─────────────────────────────────────────────────────────────┘
```

*Fig. 10*

DIGITAL IMAGE VIEWING— I

TECHNICAL FIELD

The present invention concerns improvements relating to digital image viewing and more particularly though not exclusively to a system for displaying a user's personal digital photographic images. The invention also concerns an improved and simplified method of digital imaging, enabling viewing of digital images in a similar manner as a photo album, making it a technology which can be enjoyed and appreciated by many.

BACKGROUND TO THE PRESENT INVENTION

Cameras have become an extremely popular commodity as they enable people to capture images of important moments in their lives and to eventually have a permanent record of these moments. The permanent records, whether prints or digital images, can then be revisited allowing one to visually re-live these important moments as frequently as desired.

Conventional chemical film based cameras are familiar to and owned by many people. Use of these cameras involves loading a chemical film into the camera and thereafter making a series of exposures of different parts of the film, typically 24 or 36 exposures are captured per film. Once all of the exposures have been taken, the film is usually brought to a film developing shop where photographic prints of the exposures are produced. This service usually takes a couple of days although faster development times are possible but only at an extra cost.

Although useful and easy to use, the conventional chemical film based camera has many drawbacks. That is to say, many of the users of these cameras are amateurs who are not completely certain of how, for example, to reduce or prevent the unflattering common phenomenon of 'red-eye' in pictures; or how to optimise the light in the area of interest in order to maximise the quality of the resulting prints; or how to correctly use a flash particularly near reflective objects. In this regard, it is only once the film has been developed and the money paid for this service, that the user can determine whether the film was worthwhile developing or not; previewing the photographic (captured) images is not a possibility. The generation of contact sheets used by professional photographers still requires developing of the film and is expensive. As it is not possible to preview the images as they are taken, people are not afforded the opportunity to experiment with their photography skills when using chemical film based cameras.

Furthermore, in order to share the prints with far-away family and friends, multiple copies of the prints have to be ordered. Although these can be ordered after the initial development by submitting only the relevant and worthwhile negatives of the prints, people tend to order multiple copies at the offset as it tends to be cheaper and easier, but in turn risk paying for say three copies of potentially low quality prints.

However, if a user has a chemical film developed and the resultant photographic prints are of a low quality for whatever reason, all is not lost thanks to the recent increase in the number of digital imaging shops. It is possible to bring the important but low quality prints to one of these shops where the prints, are scanned into a computer and modified as required, by removing unwanted red eye or glare for example. In this regard, a user can overcome some of the drawbacks which may occur as a result of the user's amateur photography for example. Photographic prints may also be submitted, simply to have decorative borders added or to have them printed onto one of a variety of materials such as canvas for example. However, although this is a helpful service, it can be extremely expensive.

On the other hand, if the user is fortunate enough to own a scanner and a personal computer (PC) they can scan the images into their PC, and if appropriate software has been downloaded onto their PC, they can modify the images as required. In this regard, they do not have to pay for the modifying service, but this is still expensive with the requirement of the user having access to a PC, scanner and digital imaging software. Also the time and effort taken in obtaining the desired prints may be prohibitive to the occasional user.

However, the above option of using a scanner is no longer necessary, as many digital imaging shops now offer a service whereby a user can have their chemical film based pictures placed onto a CD for viewing on a PC. For example, Kodak has developed a service whereby when a user has a chemical film developed, they can also request, as well as the normal prints and negatives, Kodak's Picture CD service in which digital versions of the prints are also recorded onto a compact disc for use in a PC. In this regard, the pictures can be viewed on the computer screen and furthermore can be modified as required. That is to say, the background lighting can be increased or decreased as necessary, or the amount of background in the photograph can be decreased making the relevant subject matter more prominent. Furthermore, if the user's PC is connected to the Internet, the images can be forwarded to friends and family as desired via e-mail. Also, if the user is fortunate enough to have a colour ink jet or laser printer, the images can be printed out giving the user a tangible, permanent record of the images. It is usually necessary to purchase expensive specialised paper for this task, as this improves the quality and durability of the resultant prints, though the results are not of as high a standard as conventional photographic prints.

In line with the development of digital imaging and digital imaging shops, there has been a rapid increase in the popularity of digital cameras which overcome many of the drawbacks associated with chemical film based cameras largely because they avoid the need for using chemical film altogether.

In contrast to chemical film based cameras and digital imaging possibilities that are now available, digital cameras provide a user with immediate access to images in digital form without the need for film processing or scanning as discussed above. In this regard, a user has the opportunity to experiment with their photography skills as they can see the end result immediately and can therefore quickly determine if their photographic experiment has been worthwhile. This allows them to learn easily and to subsequently develop their photography skills.

Many first generation digital cameras contain one or two megabytes of internal memory which is capable of storing a similar number of standard quality images as that of a role of chemical film. Once this memory is full, no further pictures can be taken until the memory is cleared by downloading the pictures onto a PC and deleting them from the camera. However, many modern digital cameras now use removable data storage in the form of a memory card or memory stick. Once such a memory card is full it can simply be removed and replaced by another memory card. The cost of such memory cards is high and this mitigates against the user having more than one or two cards at a time. The pictures are downloaded from the memory in the camera to a PC using a serial link and dedicated imaging software. Given the necessary PC hardware, memory cards can also be inserted directly into a PC and the photographic images stored thereon read as if from a floppy disk.

The general principle behind digital cameras is that pictures are taken with the camera and with some digital cameras a digitised copy of the picture is immediately displayed on a small viewer on the camera. For digital cameras without such a viewer the photographic images must be downloaded onto a PC for viewing. Irrespective of the type of digital camera employed, in order to have a detailed look at the photographic images they will ultimately need to be downloaded onto a PC; the viewers on digital cameras are often quite small and do not give a very clear image. As long as the relevant software has been downloaded onto the PC, a user will be able to modify the pictures. The extent of modification possible is directly related to the quality and type of software which has been downloaded onto the PC. Once again, if the PC is connected to the Internet, the images can be sent via e-mail to family and friends whom are also connected to the Internet.

The digital camera, or the memory card itself, may also be brought to a digital imaging shop to enable more professional modifications to be made to the pictures, and/or to have prints made of the pictures; numerous possibilities are available in this regard.

The main drawback associated with digital cameras, and digital imaging in general, is that the PC is targeted as the computing platform for viewing the digitised images. PCs are an extremely expensive commodity which many cannot afford and so these people are immediately isolated from many of the benefits associated with digital imaging. Also, PCs require dedicated software to be installed on the PC which is subsequently loaded into RAM under user control in order to enable viewing. Once this software is loaded, a user must then be able to implement the relevant program and to navigate through it. This takes time, effort and a certain amount of skill which serves to deter many from using the PC for digital imaging and indeed in general. Furthermore, installing the software on the PC in the first place can be a difficult and error prone process.

For those who own and/or have access to a PC, they are often used for work related issues. In this regard, PCs in the home are usually situated in quiet, functional rooms such as a study for example, which encourage work and concentration. A quiet study, is not an ideal environment for relaxing and leisurely viewing holiday photographs for example and this is another reason why many have not embraced the technology of digital cameras and other digital imaging techniques.

OBJECTS AND SUMMARY OF THE INVENTION

It is apparent that there are many disadvantages associated with using a PC as the computing and viewing platform for digital imaging and it is an object of the present invention to overcome at least some of these disadvantages and to improve and simplify digital photographic image viewing, making it a realistic option for the majority of people.

The present invention resides in the appreciation that many of the above mentioned problems can be overcome by use of a computing platform that is less technologically intimidating and less expensive than that of a PC, a computing platform that is associated with leisure and fun, and which is already present in many households. More specifically, the inventor has appreciated that it is highly advantageous to use a gaming console and an associated domestic visual display unit, such as a television, as an ideal viewing platform for a user's digital photographic image data.

It is to be appreciated that the term gaming console is intended to include the essential elements that are required for the gaming console to work, such as a game controller (gaming pad, joystick, etc), a power supply and a data store reader (such as a compact disc reader) for loading game software.

It is also to be understood that the term photographic image data is intended to refer to images captured by a camera.

According to one aspect of the present invention, there is provided a system for displaying a user's personal digital photographic images, the system comprising a combination of: a gaming console for playing a video game; a domestic visual display unit for displaying the video game to the user when connected with the console; and a portable digital data store including the user's digitised photographic image data and a viewing application program, the viewing application program being arranged to configure the gaming console to display the digitised photographic image data on the domestic visual display unit when the digital data store has been read by the gaming console.

There have been attempts to solve most of the above described problems before the present invention. For example, Kodak have sensed the need for an alternative viewing platform other than the PC and consequently they have marketed a digital imaging device (photo viewer) which allows digital photographic images recorded by Kodak onto a compact Disc (CD) to be viewed on a conventional television screen. This photo viewer (Kodak CD Portable player N2000) is operated by a complex wireless remote control which allows a user to choose which picture to view on the television screen. However, to appreciate some of the advantages of this way of viewing photographic image data, the user is required to purchase the not-inexpensive Kodak photo viewer, which has a dedicated format and so can only be used for the specific purpose of viewing digital photographic images which have been processed by Kodak. The photo viewer cannot be employed for any other use or for viewing photographic image data created by other digital imaging companies. Accordingly, because the viewer and CD are Kodak's exclusively, the customer is not afforded any choice in terms of where to develop their images.

On the other hand, gaming consoles, which are a substantial component of systems according to the present invention, are already extremely popular and are presently being used to play video games in millions of homes; the numbers of gaming consoles are also expected to increase dramatically in the next few years making the gaming console comparable to a common household appliance. The cost of a gaming console is substantially less than that of a PC's or that of the Kodak's CD portable player N2000. However, the advantage of the present invention is that most users will not even have to invest in a new computing platform as they can use their existing games console. In addition, a gaming console is far easier to use than a PC or the Kodak's CD portable player N2000 because of their design. More specifically, a typical gaming pad (game controller) for a gaming console only contains a few control buttons which are usually brightly coloured and are designed generally for ease of use by the younger generation, and so their design ensures that they can be easily held and readily manipulated even by children.

A gaming console is an operatively simple household computing platform for viewing a user's digital photographic image data. This is because in accordance with the present invention the image viewing application program, present on the portable data store along with the photographic digitised image data, contains all of the information required to view the pre-captured photographic images and also determines the resultant quality of the digitised images. Gaming consoles, unlike PCs, are inherently general purpose and are designed to operate according to the information present on the portable data store which is placed in the gaming console. A user does not have to configure a gaming console prior to use which makes them an extremely tempting and easy to use computing platform. That is to say, gaming consoles are ROM-based which means that they require no complicated user installation of a viewing application in the console. Rather, the required operating system and basic video generation functions reside in the ROM of the console, and all applications are automatically loaded simply by placing the removable data store, such as a CD, in the console's CD drive. Unlike a PC, the user is advantageously not required to do any technical work in order to use the viewing system of the present invention.

The use of a gaming console in the system of the present invention enables all of the advantages associated with its general purpose nature to be utilised. The software format required to run an application program on a gaming console is readily provided by the console manufacturers to encourage software houses to produce video games for the console. Accordingly, digital imaging companies such as Kodak, Agfa and Fuji, are afforded the opportunity to distinguish themselves from their competition by developing their own unique viewing application programs in accordance with the available games console format to be placed on a portable data store and to be used in a system according to the present invention. Each digital imaging company may produce a digital image viewing album which carries their corporate image which is instantly recognisable by the user and servers to additionally market the company. The customer/user also benefits as this leads to healthy competition amongst the imaging companies ensuring reasonable prices and a range of choices available to the customer.

More specifically, one company may develop a range of digital photographic image viewing application programs which may include various image enhancing algorithms which will ensure extremely high quality digital images. Another company, on the other hand, may decide to include relevant background music, specified special effects, or decorative frames around the photographic images, as part of their photographic image presentation applications. The imaging company can ultimately decide what features they wish to include on their viewing application. The resultant quality of the digital images will depend on the viewing application chosen by the customer and not on the ultimate modifications made to the pictures by the customer which is often the situation with PC-based digital imaging; the customer does not have to do any modifications after a CD has been purchased.

Accordingly, the viewing application program may comprise a plurality of user-selectable digital effects algorithms for altering the presentation of the user's digitised photographic image data on the domestic visual display unit. Thus by using the simple controls (gaming pad) of the gaming console the user can select different ways of viewing their digital photographic image data according to their particular preference. Also as the characteristics of the domestic visual display unit may vary from household to household, the provision of different optimising algorithms can advantageously enable the user to select the one which gives the best image on their visual display unit.

Similarly, the portable digital data store may comprise a plurality of user-selectable viewing application programs, each program providing a different algorithm for displaying the user's digitised photographic image data in a different way on the domestic visual display unit. Also each program may be arranged to provide a different photographic enhancement of the user's digitised photographic image data. These features advantageously enables a user access to different algorithms specific to a particular imaging company such that the user can select which company's algorithm they would wish to use. This availability of choice is a significant departure and provides distinct advantages over the system of the Kodak CD portable player N2000. Payment issues for using a particular company's algorithm could be readily dealt with by use of a selected algorithm requiring the user to input a pre-purchased password, for example.

Gaming consoles are being developed substantially and the forthcoming additions to the gaming consoles market such as Dolphin™ and X-Box™ will have a connection to the Internet and will be capable of playing high-capacity DVDs. Accordingly, the gaming console may comprise communication means for connecting the console to a wide area network, such as the Internet, and the viewing application program may comprise a communications program for transmitting information to a remote party via the communications means and the wide area network. The provision of this communications link via the wide area network enables communication with other similarly enabled gaming consoles such that the viewing experience can be shared. Also advantageously requests are made possible for information not present on the portable data store but which can be accessed via the wide area network.

Preferably, the communications program is arranged to transmit a user selection command and/or the user's digitised photographic image data to a remote party. This enables the digital photographic image data viewing experience to be shared as mentioned previously. Also the users digital photographic image data can be sent to the remote party for simultaneous viewing or viewing at a later time.

The gaming console may comprise means for receiving and digitising a user's voice into voice data and the communications program is arranged to transmit the voice data over the wide area network to the remote party. This enables the user and a remote party to discuss aurally the images which may be being displayed to both of them on their respective systems. Being able not only to see but also to discuss the photographic images is a highly attractive commercial feature of the present invention.

The communications program may be arranged to implement compression of data to be transmitted and decompression of data received via the communications means. Clearly, the use of compression and decompression techniques minimises communication time over the Internet for example, thereby bringing the user ever closer to an effective real-time communication link to the remote party.

In an embodiment of the present invention, the communications program comprises an applet for enabling two-way communications between the gaming console and the remote party. This is a simple way of implementing an Internet communications program in the present invention.

The applet may be arranged to password protect access to part or all of the data to be transmitted with the user inputting a password associated with the data to be transmitted. In this way, if confidential photograph image data is to be transmitted to a remote paty, the user can ensure that the remote party is either only able to view all or selected photographic images if they have access to the correct password to unlock the transmitted photographic image data.

Similarly, received data may be password protected and the applet may be arranged to enable access to part or all of the received data once the user has input a correct password associated with the received data. In this regard, the term password is intended to have a broad meaning such that it includes passcodes and any alphanumeric characters or even biometric identifiers.

The other substantial component of the digital imaging system according to the present invention is the domestic visual display unit, such as a television, to which the gaming console is connectable and upon which the relevant digital photographic images are displayed. It is to be appreciated that televisions in the home are typically situated in a room such as a living room which is often used for relaxation and enjoyment and this, in combination with the fact that gaming consoles are associated with playing video games, leisure and fun, ensures that viewing digital photographic images, in accordance with the present invention, is far easier proposition than with a PC.

The viewing application program may enable multiple images of the digitised photographic image data to be displayed to the user simultaneously and a gaming controller of the gaming console may enable the user to navigate through the multiple images. This advantageously enables easier viewing of all of the photographic images which have been taken such that selection is made easier. This is particularly the case when the multiple images are in the form of thumbnail images because the maximum number of images can be displayed simultaneously.

According to another aspect of the present invention there is provided a method of viewing a user's photographic image data, the method comprising: digitising the user's photographic image data; selecting a viewing application program for viewing the user's digitised photographic image data; recording the user's digitised photographic image data and the selected viewing application program onto a portable digital data store having a format suitable for use in a video gaming console; running the selected viewing application program on a video gaming console by reading the portable digital data store; and displaying the user's digitised photographic image data using the selected viewing application program on a domestic visual display unit connected to the video gaming console.

The advantages of the present invention over the existing viewing methods using a PC and the system of the Kodak CD portable player N2000 have already been described above in relation to the choice provided to the user of imaging companies viewing application programs that can be used.

BRIEF DESCRIPTION OF THE DRAWINGS

In order that the present invention can be more readily understood, reference is now made, by way of example, to the accompanying drawings in which:

FIG. 5 is a schematic view of an options screen presented to the user when using the gaming console of the first embodiment;

FIG. 6b is a schematic view of a selected image screen presented to the user when selected from the thumbnail screen of FIG. 6a;

FIG. 10 is flow diagram detailing how the sharing operation shown in FIG. 9 is achieved;

DETAILED DESCRIPTION OF THE PREFERRED EMBODIMENTS OF THE PRESENT INVENTION

Figure 1:
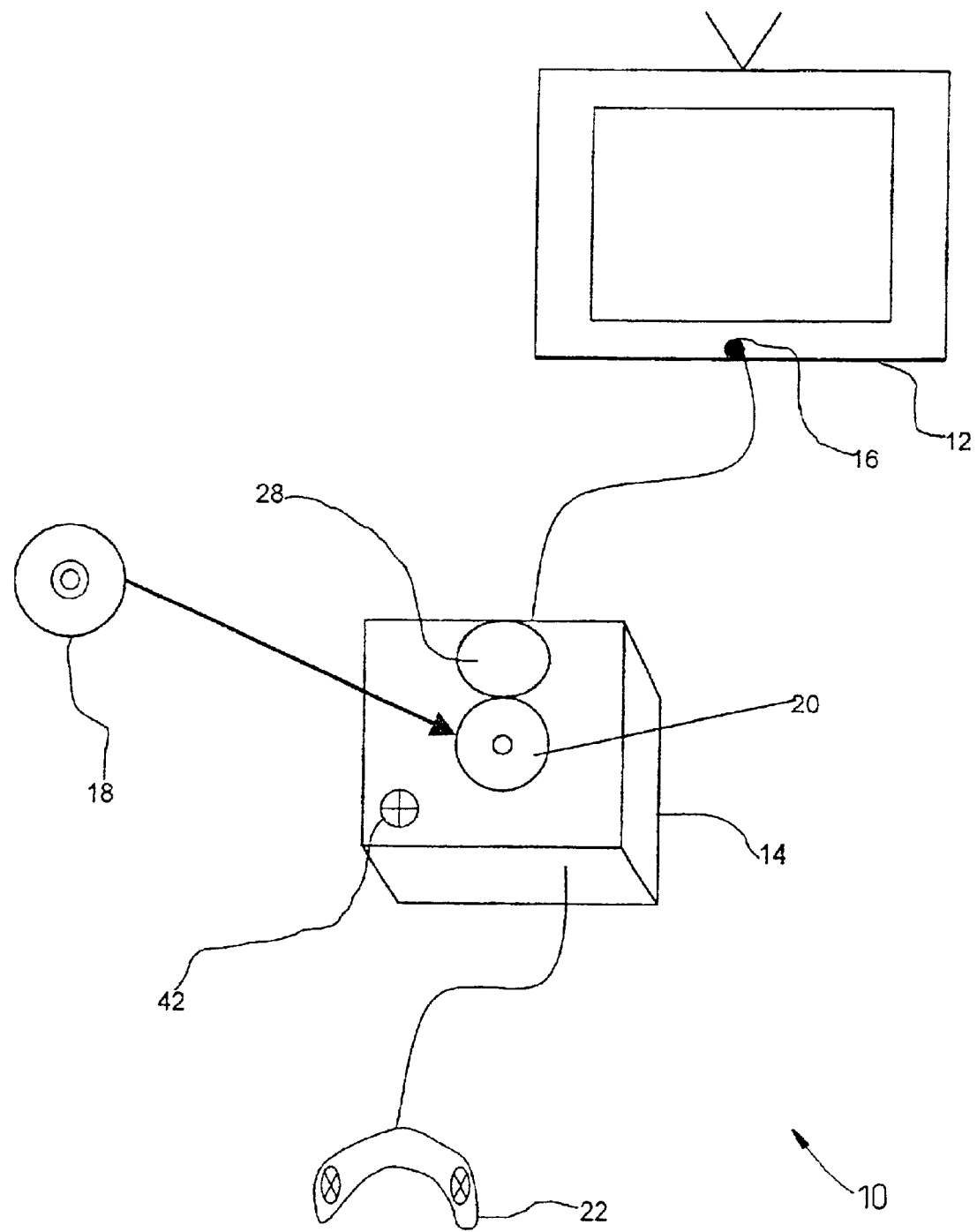
FIG. 1 is a diagrammatic representation of a digital imaging system in accordance with a first embodiment of the present invention.
Figure 2:
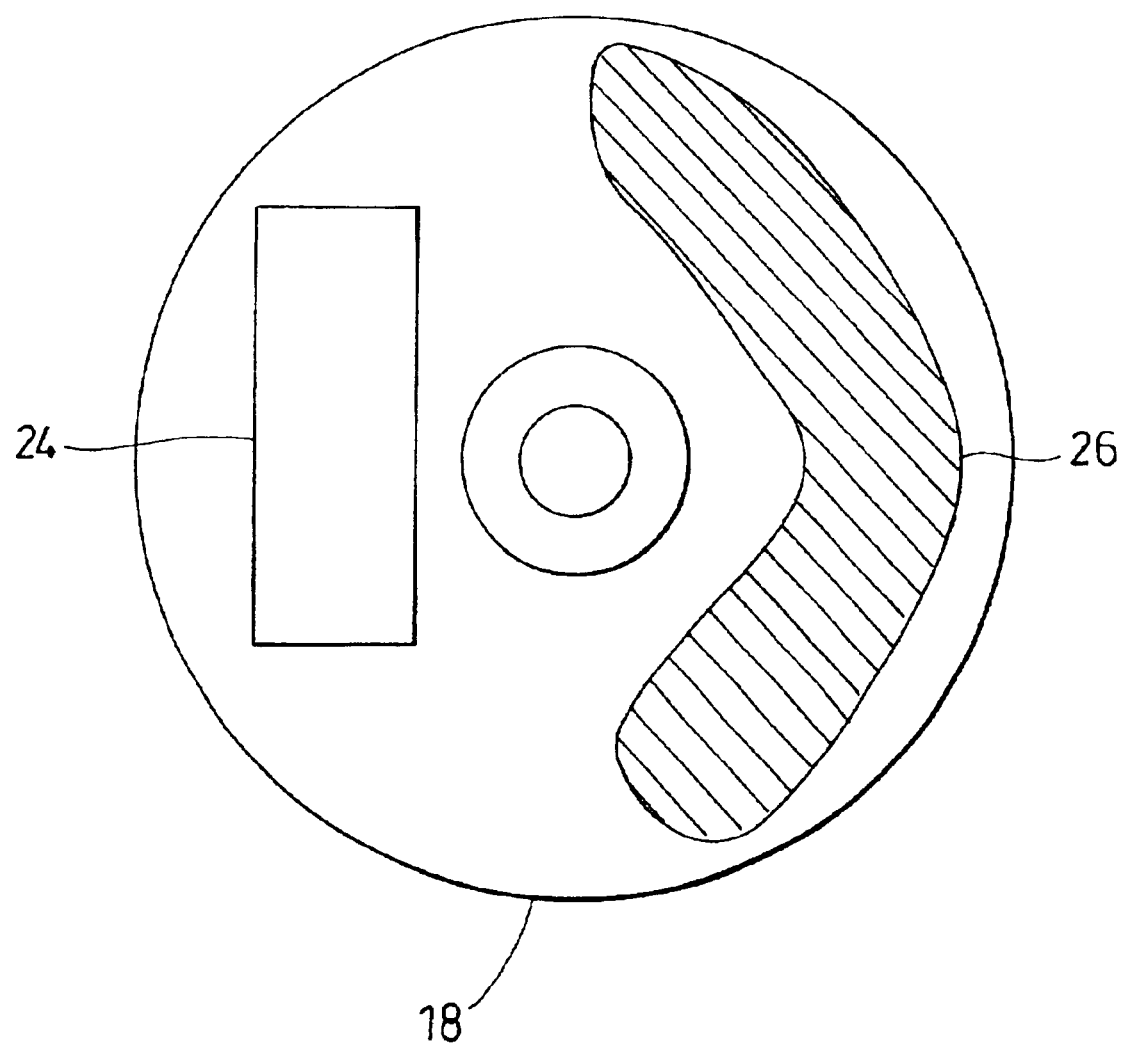
FIG. 2 is a diagrammatic representation of the compact disc used in the digital imaging system as shown in FIG. 1.

Referring to FIGS. 1 and 2, a digital imaging system 10 according to a preferred embodiment of the present invention comprises a domestic television 12, a standard video gaming console 14 (such as a Sony PlayStation) connected to the television 12 via the aerial (UHF) socket 16 and a specific compact disc (CD) 18 for use in the gaming console 14. The gaming console 14 has a compact disc drive bay 20 for reading digital data stored on the CD 18 when the same is placed therein. The gaming console 14 also has a gaming pad (controller) 22 connected thereto for use in receiving simple control instructions from a user (not shown) in order ordinarily to facilitate the playing of a video game. However, the easy-to-operate gaming controller 22 is used in this embodiment for controlling the operation of the digital imaging system 10.

The CD 18, shown in detail in FIG. 2, contains a user's digitised pre-captured photographic image data 24 and a photographic image viewing application program 26. (The way in which this CD is created from the user's raw photographic image data is described in detail later.) The photographic image viewing application program 26 contains all of the information necessary to configure the gaming console 14 to enable the digital photographic image data 24 to be displayed under user control on the television 12. Accordingly, in order to display the user's digitised photographic image data 24, the user simply turns on the television 12 and the gaming console 14, inserts the CD 18 into the compact disc drive bay 20 and closes the lid 28 of the drive bay 20. The gaming console 14 automatically loads the photographic image viewing application program 26 and uses it to display the user's digital photographic image data 24 on the television 12.

Figure 3:
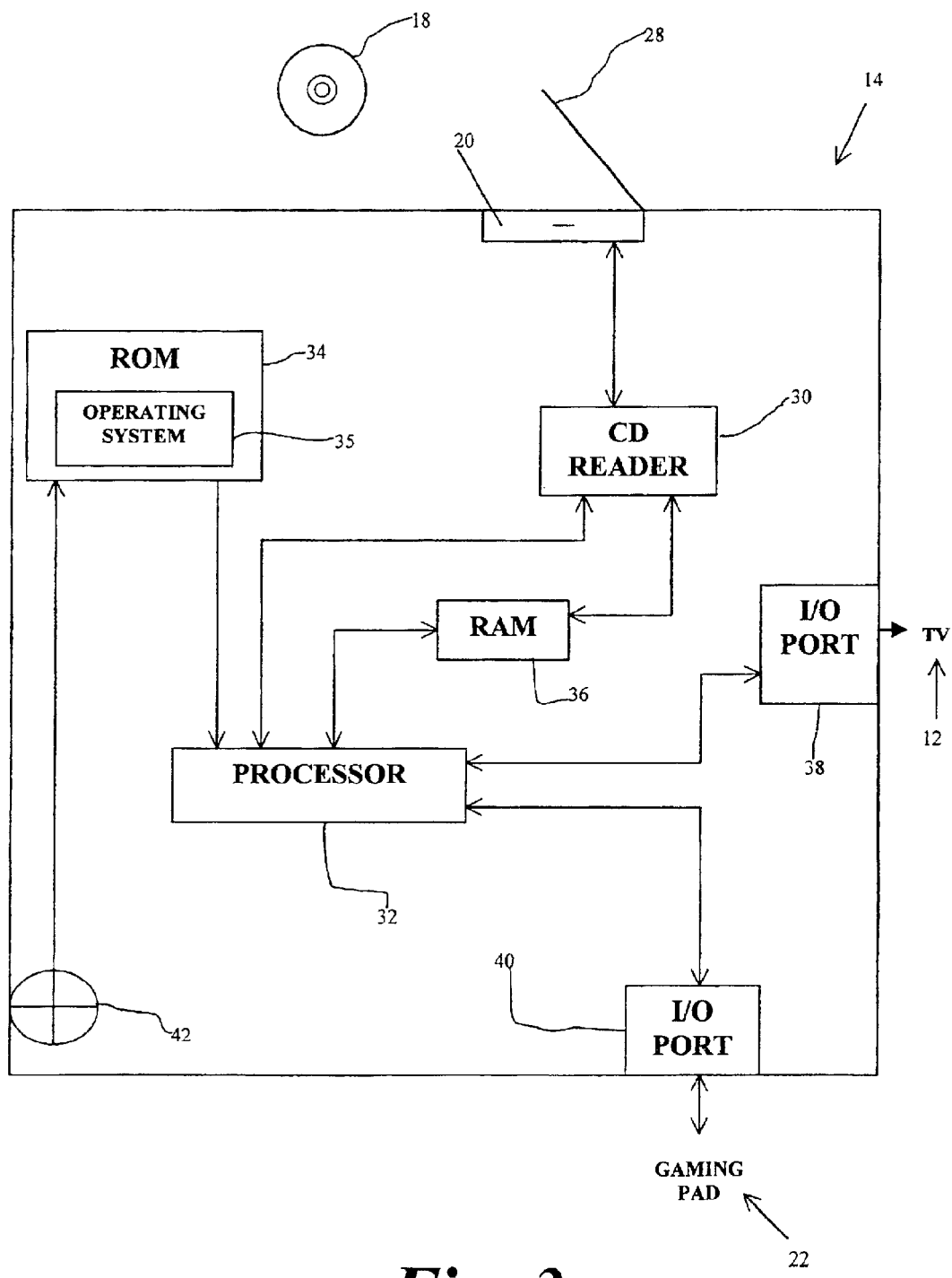
FIG. 3 is a schematic representation showing the major internal components of a gaming console used in the digital imaging system as shown in FIG. 1, and how these components interact with each other.
Figure 4:
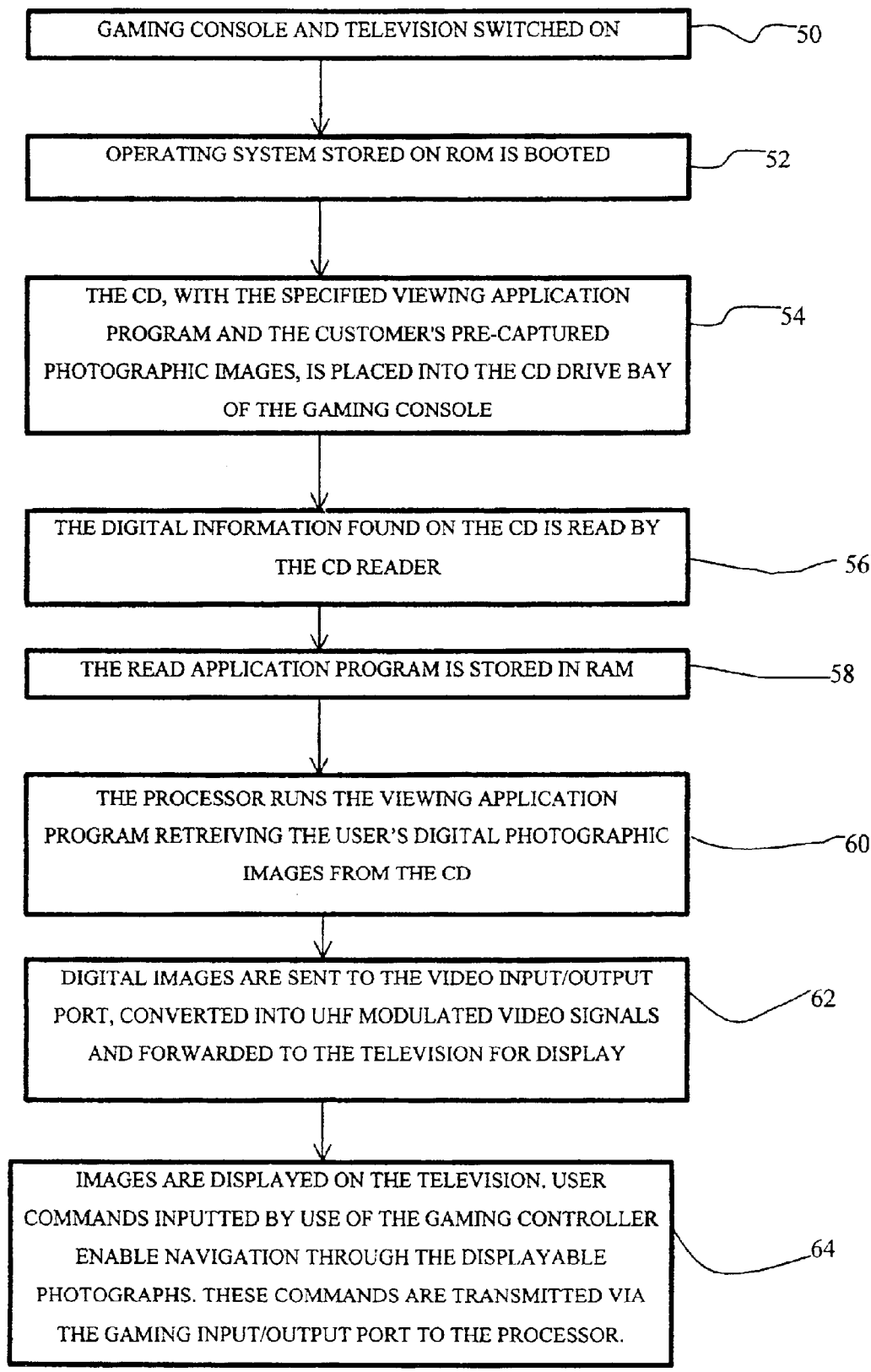
FIG. 4 is a flow diagram detailing how the gaming console of FIG. 3 operates.

More specifically, the way in which the gaming console 14 operates to take the information from the CD 18 and displays it on the television 12 is now described with reference to FIGS. 3 and 4. FIG. 3 shows an overview of the basic elements of the gaming console 14. As mentioned previously, the gaming console 14 comprises a compact disc drive bay 20 into which the CD 18 can be placed. The compact disc drive bay 20 is connected to an optical CD reader 30 which is used to read the information stored on the CD 18 when it is placed in the drive bay 20. At the heart of the gaming console 14 is a processor 32 which implements the instructions obtained from reading the viewing program 26 stored on the CD 18. The processor 32 is connected to a ROM 34 that stores the basic operating system 35 of the gaming console 14. Similarly, the processor 32 is also connected to same RAM 36 that is used for temporarily storing data such as photographic image viewing application program 26 once the disc 18 has been read. Digital images read by the optical CD reader 30 are then output to a video I/O port 38 from which UHF modulated video signals can be generated and sent to the television 12 for display. A gaming I/O port (typically a serial port) 40 is used to connect the gaming controller 22 to the console 14 and user initiated control signals received from the controller 22 are forwarded to the processor 32 to control the viewing program 26. Finally, the mains power supply to the gaming console 14 is controlled by an on/off switch 42.

The specific way in which the gaming console 14 operates to display the user's digital photographic image data is now described with reference to FIG. 4. The method commences with the gaming console 14 and television 12 being switched on at 50. This serves to boot at 52 the operating system 35 of the gaming console 14 which is stored on the ROM 34. The basic functions for operating the gaming console 14 are thus activated. One of these basic functions is the operation of the CD reader 30 which is configured to monitor the drive bay 20 and to read information from a CD when the same has been loaded in the bay 20 and the bay door 28 has been closed.

The user then at 54 places the CD 18 (having the viewing application program 26 and the user's personal photographic image data 24 provided thereon) into the drive bay 20 and closes the drive bay door 28. The digital information 24, 26 stored on the CD 18 is then read by the CD reader 30 at 56. The viewing application program 26 is loaded at 58 into the RAM 36 under the control of the operating system 35 running on the processor 32. The program 26 is run on the processor 32 at 60 and this results in the user's digital photographic image data being retrieved for display from the CD 18. Some or all of these digital photographic images may be retrieved as is described in detail later. Retrieved digital images are sent at 62 to the video input/output port 38, converted into a video format signal, UHF modulated in order to be compatible with the television signal input format and forwarded to the aerial socket 16 of the television 12 for display thereon. It is possible for the unmodulated video format signal to be sent directly to the television if the television is capable of accepting such signals, for example, if it has a Scart socket.

The user's photographic images 24 are then displayed on the television 12 at 64 and the program monitors input signals from the gaming controller 22 via the gaming input/output port 40 to determine navigation through the photographic images. The viewing program may also have user selectable options such as special effects programs and these can also be selected by simple use of the gaming controller 22.

Referring now to FIG. 5, an options screen 70 that is presented to the user once the CD 18 has been read by the gaming console 14 is shown. The screen 70 has an option 72 for allowing viewing of the images 24 in a standard serial manner which maximises the amount of screen area for viewing the images 24. If this option is chosen, the program 26 makes navigation simple and intuitive by displaying the first of the user's images and on activation of a button on the gaming controller 22 displays the next image stored on the CD 18. Two buttons on the controller 22 can simply be used for back and forth serial navigation through the plurality of photographic images stored on the CD 18.

The second viewing option 74 is for displaying the user's photographic information in the format of thumbnail images. This is described later with reference to FIGS. 6a and 6b. A third viewing option 76 groups together several user selectable special effects. More specifically, the user can select a black and white viewing option 78 which displays the images 24 as monochrome images. A gamma correction option 80 is provided which enables the user to change the video signal output in order possibly to improve the quality of the images seen on the specific television 12 that is being used, each television 12 requiring its own different gamma correction. This option 80 uses standard gamma correction algorithms which are well known in the art and need not be described herein. The red-eye reduction option 82 enables the user to reduce or remove red-eye defects found in some user's photographs. Similarly, the glare reduction option 84 executes a standard algorithm which enables improvement of the quality of user's photographs taken with high levels of glare.

Figure 6A:
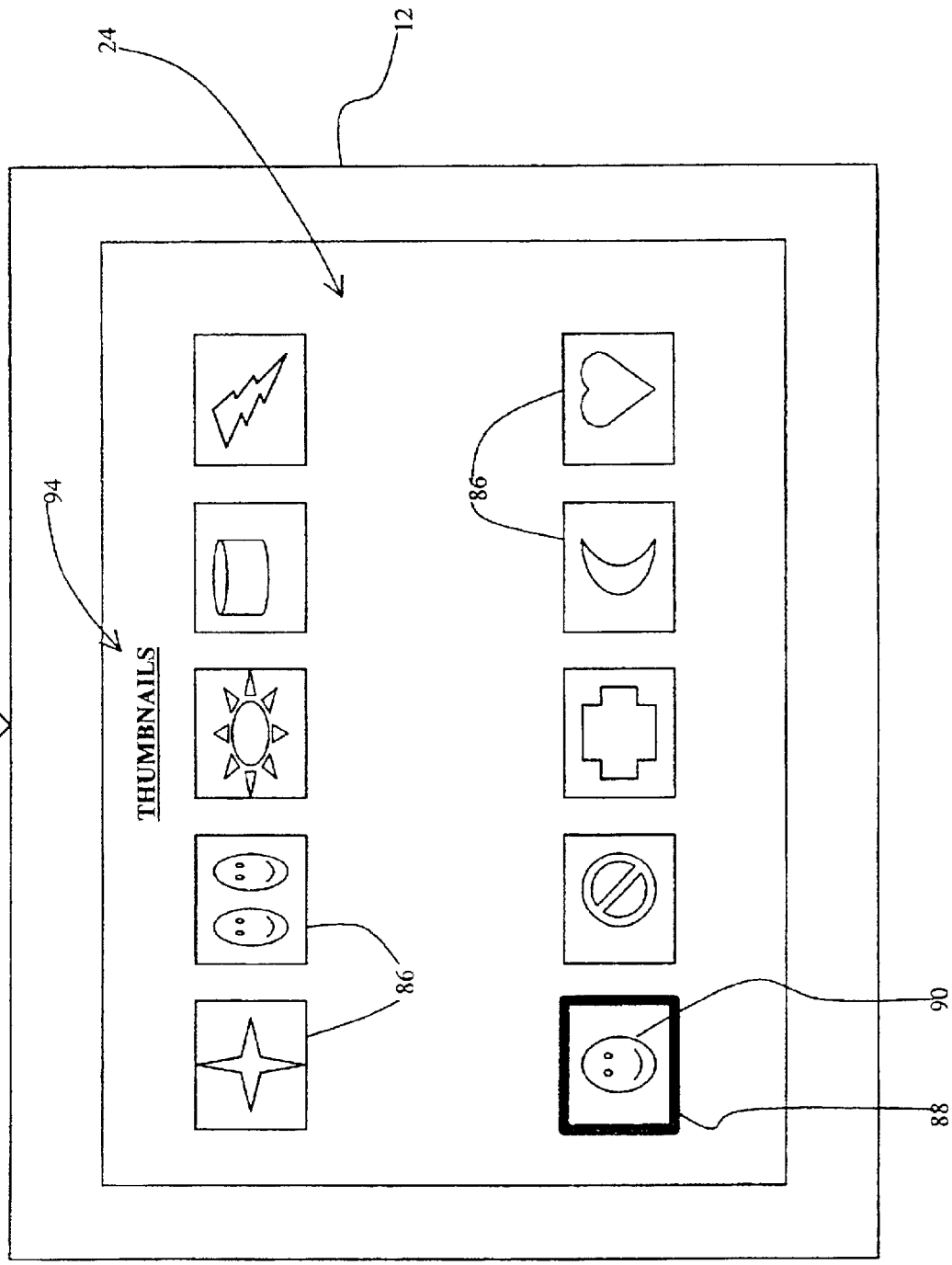
FIG. 6a is a schematic view of a thumbnail screen presented to the user when selected from the options screen of FIG. 5.
Figure 6B:
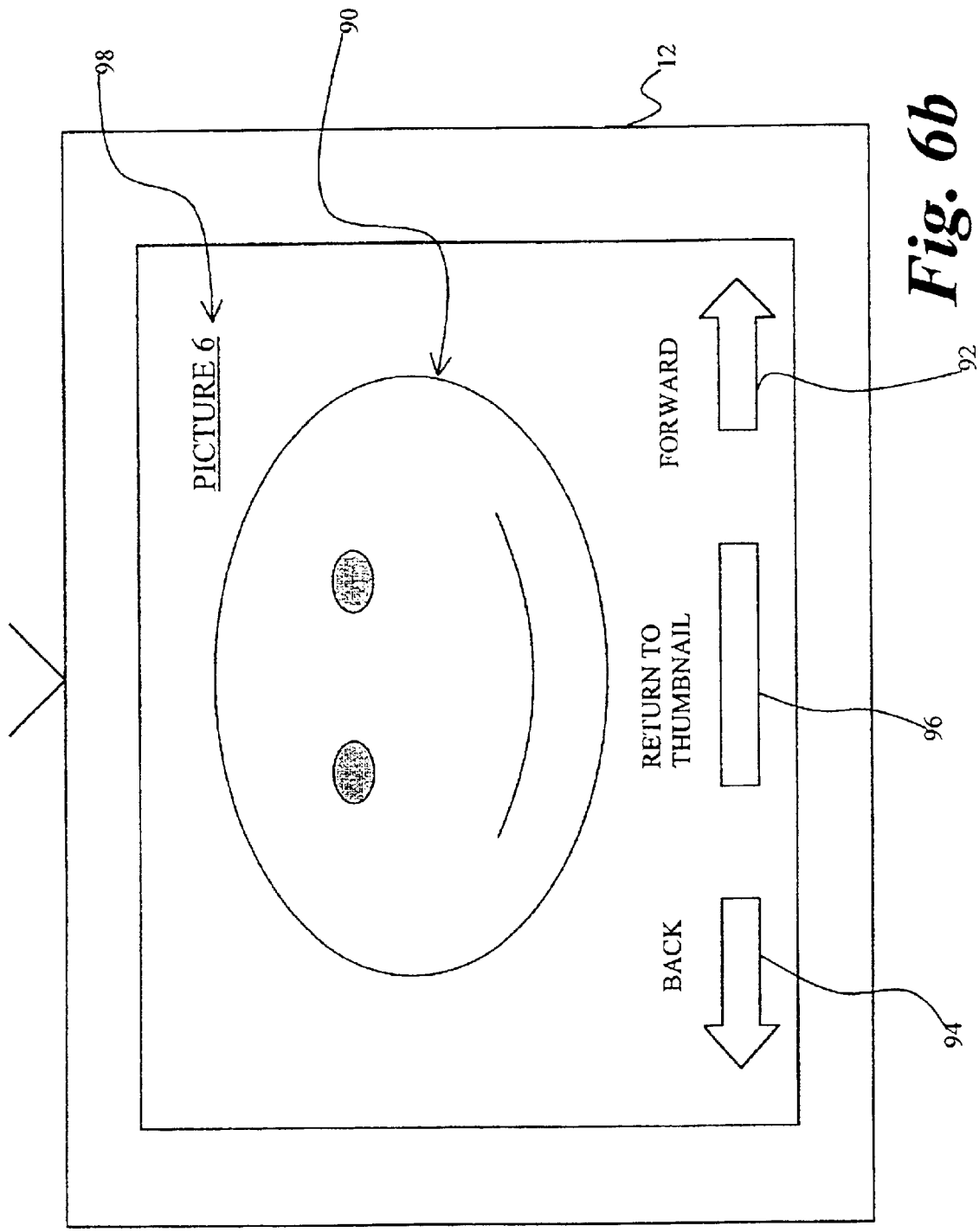

Referring now to FIGS. 6a and 6b, the screens shown to the user if the thumbnails option 74 is chosen are now described. If this option is chosen the photographic images 24 are all retrieved at once from the CD and a reduced size image 86 of each different photographic image 24 is displayed to the user in the format of a thumbnail image. A cursor 88 is provided on the screen for indicating the current selected thumbnail image 86. Movement of the cursor 88 by manipulation of the gaming controller 22 by the user enables the user to interact with the data to control what is to be selected for the next display. More particularly, selection of a particular thumbnail image 90 enables that image to be enlarged for viewing on a new screen as is shown in FIG. 6b. The enlarged thumbnail image 90 is displayed to the user together with some basic navigation controls 92, 94, 96. More specifically, the navigation controls comprise a forward button 92 for viewing the next full size image of the stored images 24, a back button 94 for viewing the previous full size image of the stored images 24 and a return button 96 for returning to the thumbnail screen shown in FIG. 6a. The screen of FIG. 6b showing the enlarged thumbnail also has a unique label 98 for identifying to the user which photographic image is being displayed.

Figure 7:
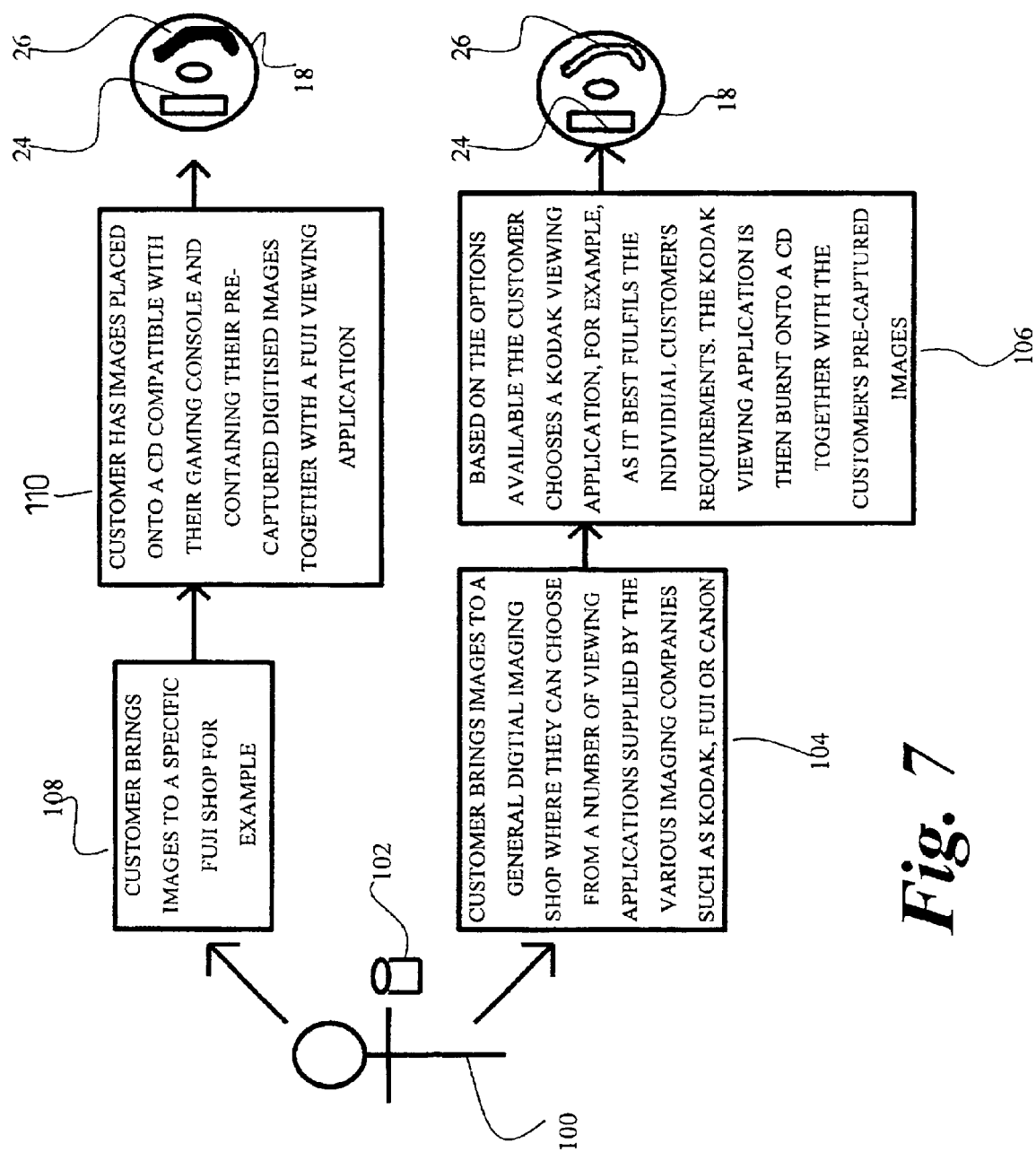
FIG. 7 is a diagrammatic representation of two of the options available to a customer when purchasing a CD as shown in FIG. 2 for use in a digital imaging system as shown in FIG. 1.

Prior to operating the system 10 as described above, the user has to obtain the compact disc 18 containing the user's personalised photographic image data 24 and the way used in the present embodiment is now described together with a viable alternative. Referring to FIG. 7, the user 100 brings a set of pre-captured images 102, which can be in the form of a chemical film or prints, or can be stored in a digital camera or on a memory card from a digital camera, to a general digital photo finishing shop providing a digital processing service 104 so that the specific pre-captured images 102 can be recorded onto the CD 18. The general digital photographic image finishing shop offers services from numerous digital imaging companies including Kodak and Fuji, for example, all distinguishing themselves from the competition on the basis of the viewing application they offer and/or the price for choosing their service. The customer can then choose at 106 whichever viewing application satisfies their needs. The user 100 also specifies at 106 the type of gaming console 14 which they wish to use and the digital processing service 104 places the digital photographic image data 24 into a format compatible with the customer's gaming console 14 and records this image data 24 onto the CD 18. In addition, at 106 the digital processing service 104 places the user selected viewing program 26 on the CD 18. So, for example, the customer might choose to have their images burnt onto a CD compatible with a PlayStation gaming console and with a viewing application provided by Kodak. In the present embodiment, the user selected program 26 has various viewing options 72, 74, 76 which have been described previously with reference to FIG. 5. The customer 100 soon thereafter receives the CD 18, which contains high-quality digitised images 24 of their pre-captured pictures 102 together with the program 26 for viewing the image data 24 on their specified gaming console 14.

An alternative is for the customer/user 100 to take set of pre-captured images 102, to a specific imaging company's digital photo finishing shop, such as Fuji's digital imaging shop which provides a Fuji digital processing service 108 so that the specific pre-captured images 102 can be recorded onto the CD 18. The user 100 specifies at 110 the type of gaming console 14 which they wish to use and the digital processing service 108 places the digital photographic image data 24 into a format compatible with the customer's gaming console 14 and records this image data 24 onto the CD 18. In addition, at 110 the digital processing service 104 places the Fuji viewing program 26 on the CD 18.

A second preferred embodiment of the present invention is now described. The second embodiment is similar to the first embodiment and in order to avoid repetition, the following description is restricted to the differences between the first and second embodiments.

Figure 8:
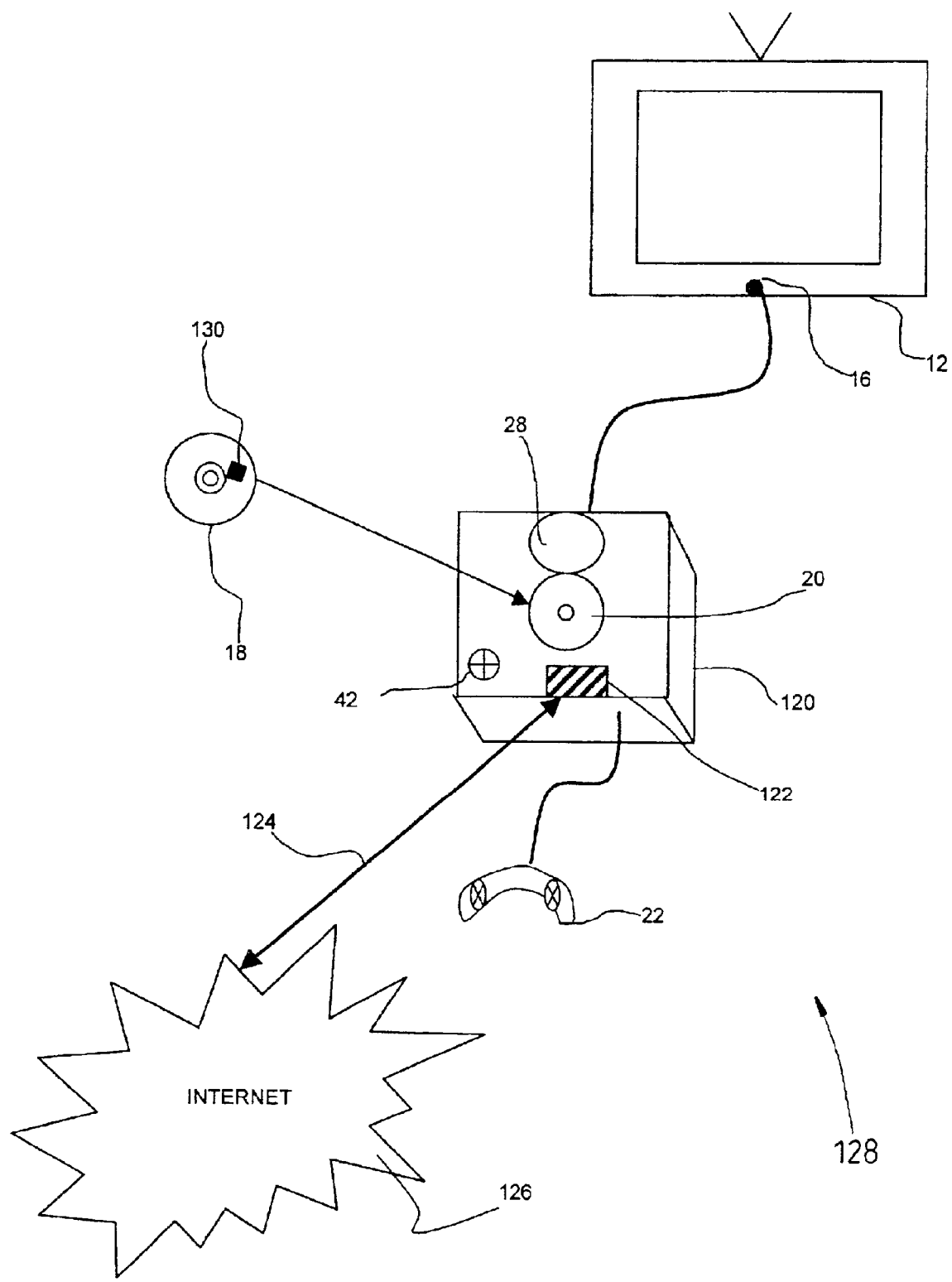
FIG. 8 is a diagrammatic representation of a digital imaging system in accordance with a second embodiment of the present invention.

Referring now to FIG. 8, the major difference between the first and second embodiments is that the gaming console 120 of the second embodiment comprises a modem 122 and a telephone link 124 to the Internet 126. This communications link enables the system 128 to exploit maximally the potential that Internet access provides. In order to use the modem 122 and establish connections via the Internet, the application program 26 provided on the CD 18 also comprises a communications program in the form of an applet 130. The applet 130 is used to control the information transmission to and from the Internet 126 and uses standard compression techniques and as well as Internet Protocol to achieve this. The system 128 of the second embodiment enables the pre-captured digital photographic images 24 present on a specified CD 18 to be shared remotely with others as will now be described in detail below.

There are three different options that can be employed in order to enable sharing of the user's digital photographic images for use in the system 128 according to a second embodiment of this invention. Each of these different sharing options requires the system 128 to be configured slightly differently. However, each relies on the user and the person who is to share the photographic image viewing experience to each have their own gaming console 120, with Internet enabled access (modem 122), a television 12 and the applet 130 provided on their CD 18. Each of these different sharing options is now described in detail.

Figure 9:
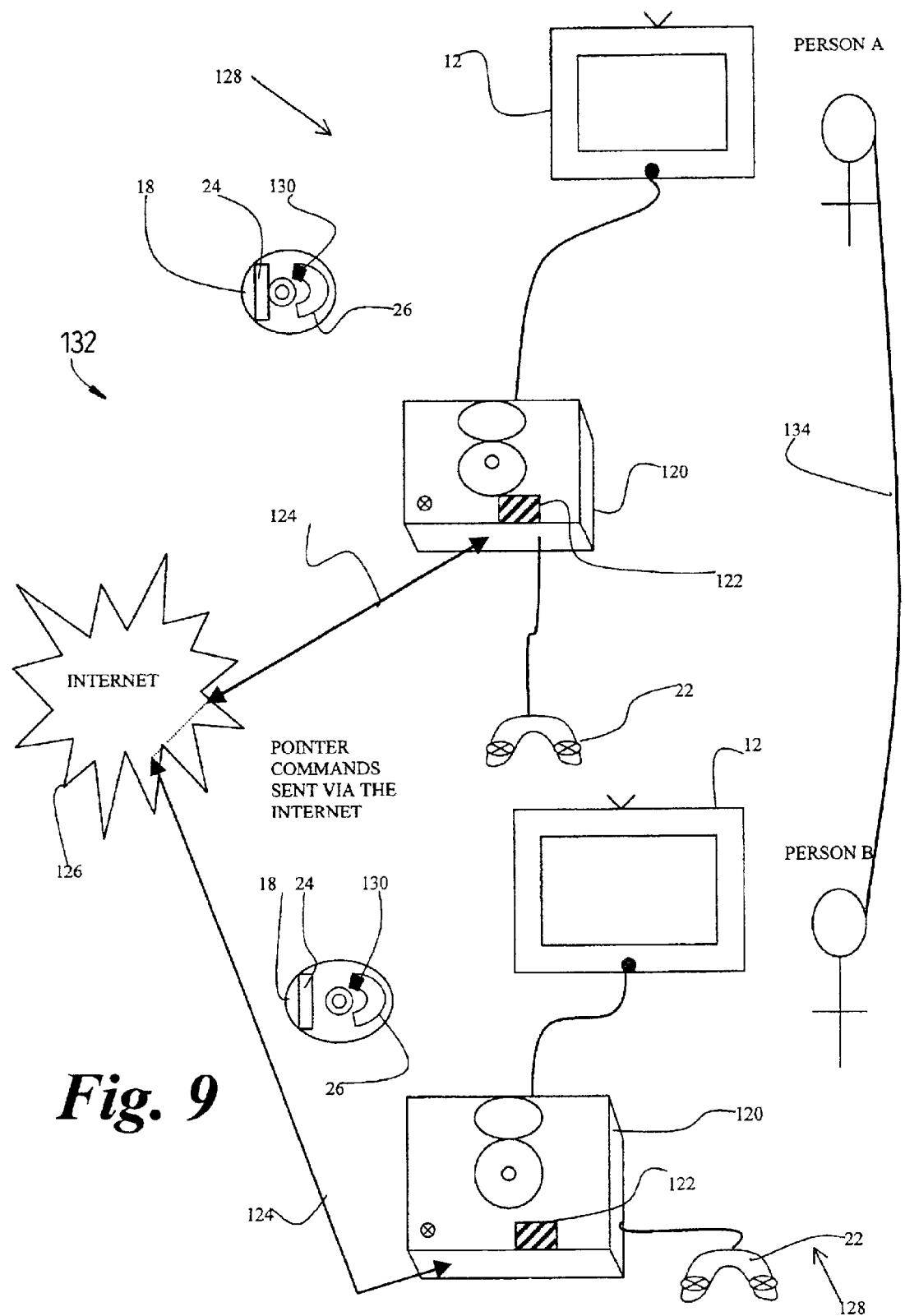
FIG. 9 is a diagrammatic representation showing a first option of how the digital information present on a CD can be shared with a remote party using a digital imaging system according to a second embodiment of the present invention.

With reference to FIG. 9, the first sharing option comprises using a distributed system 132 configured with two of the systems 128 of FIG. 8 connected back to back, one for the user (person A) and the other for the sharing person (person B). Both systems 128 are herein after referred to as subsystems of the distributed system 132 and are connectable together via the Internet 126. Also both Person A and Person B can communicate with each other aurally via a public telephone network 134.

The way in which the distributed system 132 is used for implementing the first sharing option is now described with reference to FIG. 10. When a customer/user (Person A) is ordering a CD 18 compatible with their gaming console 120 with Internet access, a further fee is paid to the imaging company to have the sharing applet 130 included at 140 as part of the viewing application recorded onto this CD 18. Person A orders at 142 another copy of the CD 18 and asks that for copy CD 18 to be forwarded to the sharing person, such as a friend or family member, (Person B). Person A subsequently receives at 144 their CD and Person B's CD is forwarded to them.

When both parties have received their respective CDs 18, Person B, for example, contacts at 146 Person A via the public telephone network 134 to let them know that they would like to view the images present on the CD 18. Person A and Person B both turn on at 148 their respective gaming consoles 120 and televisions 12 and place their CDs 18 in the CD drive bay 20 of their gaming consoles 120. This action 148 serves to activate at 150 the sharing applets 130 on each person's gaming console 120. The activation of the applets 130 generally enables information pertaining to the way in which Person A is viewing the images on their gaming console 120 to be transmitted to Person B such that the viewing experience can be shared. The applet 130 operating on Person B's gaming console 120 synchronises and copies the way in which Person A is controlling viewing of the image data 24 on their gaming console 120. Accordingly both parties can enjoy the viewing experience together at the same time. There is no need for additional security because both parties have a full copy of the images and none are transmitted between them. Furthermore, Person A and Person B can discuss at 152 the various images 24 over the public telephone network 134 at the same time as viewing them.

Additionally, by manipulating the easy-to-use gaming controller 22, pointer information can be generated. Positional information commands can be sent via the Internet between the parties such that one person can use a pointer on their screen to identify a feature and the same pointer in the same position is generated on the other person's television 12. That is to say, Person B may wish to ask about the identity of a particular person present in one of the images 24, and instead of trying to describe what the person is wearing or what they look like, they can simply identify to the person on their television screen 12 using a pointer controlled by their gaming controller 22, and a pointer to the same person will be indicated on Person A's television screen 12. Thus the images can be enjoyed in great detail by both parties.

Figure 11:
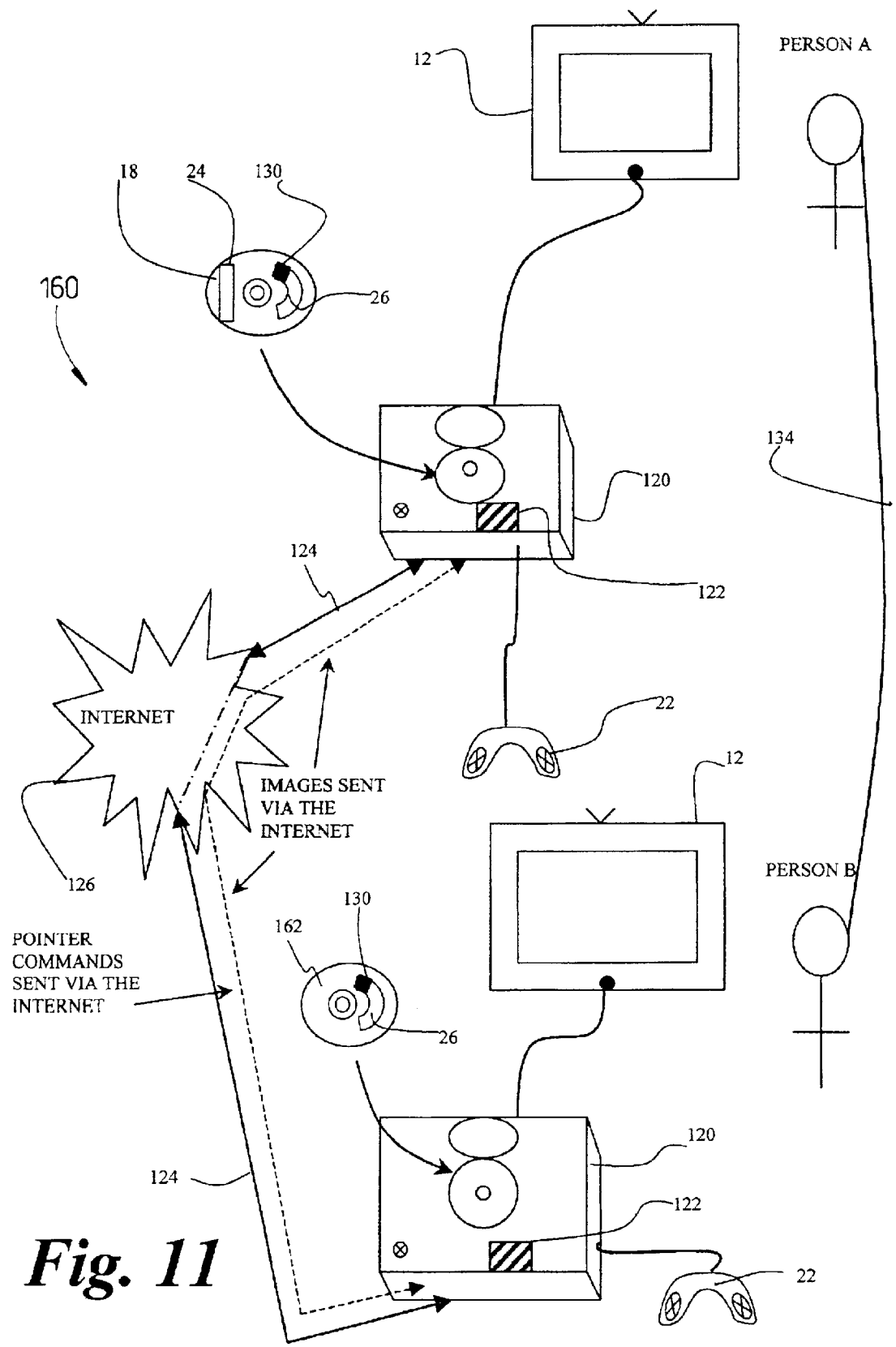
FIG. 11 is a diagrammatic representation showing a second option of how the digital information present on a CD can be shared with a remote party using an enlarged digital imaging system according to a second embodiment of the present invention.

A second sharing option is now described with reference to FIGS. 11 and 12. The second sharing option uses a distributed system 160 which is very similar to that of the first option. However, the major physical difference between the distributed systems 132, 160 of the first and second sharing options is that in the second option, a viewing CD 162 supplied to Person B is the same as the previously described CD 18 except that it does not contain any of the user's digital photographic image data 24 which is to be shared as can be seen in FIG. 11. Rather, when Person B wishes to view Person A's photographic image data, it is transmitted to Person B from Person A under control of the applets 130.

Figure 12:
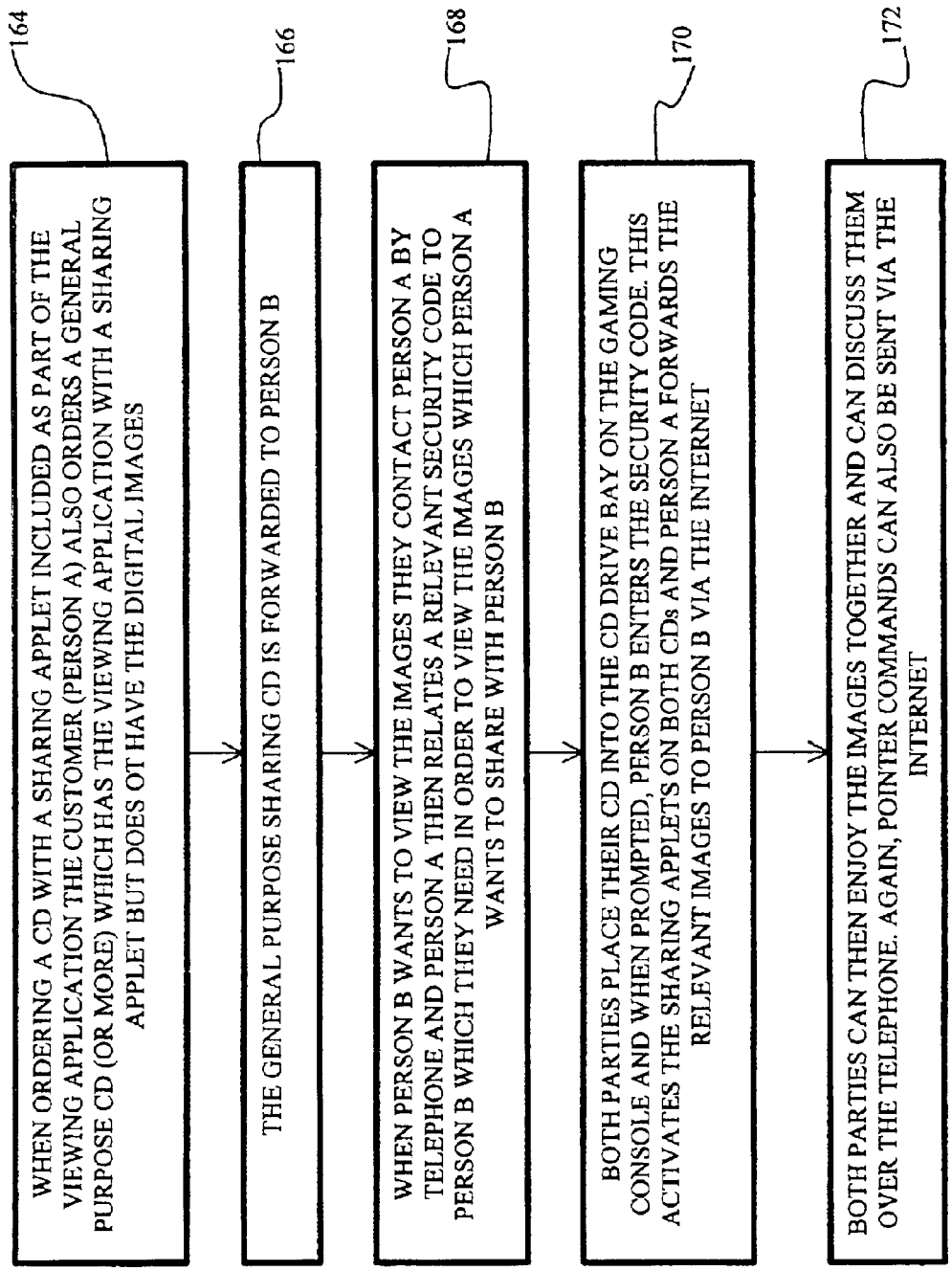
FIG. 12 is a flow diagram detailing how the sharing operation shown in FIG. 11 is achieved.

More specifically, referring to FIG. 12, when Person A orders at 164 a CD 18 for viewing their digital photographic images 24, they also order another general purpose CD 162 which contains the same viewing application 26 and sharing applet 130, but which does not contain Person A's digitised images 24. This general purpose CD 162 is then forwarded at 166 to Person B. Person A is given a relevant security code to allow access to the images which Person A wants to share with Person B and each of the applets 130 has a password protection function which is used to restrict access to photographic image data 24.

Once both parties have received their respective CDs 18, 162, Person B contacts at 168 Person A via the telephone network 134 and asks to view the photographic images 24. Person A then relates at 168 the necessary security code to Person B.

At this time, both parties turn on at 170 their gaming consoles 120 and televisions 12 and place their respective CDs 18, 162 in the CD drive bays 20 of their gaming consoles 120. Person B then enters the security code when prompted, and this action 170 serves to activate at 170 the sharing applets 130 on each person's gaming console 120. The activation of the applets 130 enables specified images to be forwarded from Person A's gaming console 120 to Person B's gaming console 120, via the Internet 126, and both parties subsequently are able to enjoy the images together. Also as in the previous option the activation of the applets enables information pertaining to the way in which Person A is viewing the images on their gaming console 120 to be transmitted to Person B such that the viewing experience can be shared. The applet 130 operating on Person B's gaming console 120 synchronises and copies the way in which Person A is controlling viewing of the image data 24 on their gaming console 120.

Person A can talk through the album with Person B over the telephone network 134. Again, pointer commands can also be sent via the Internet. The resolution of the images is not a problem as the sharing applet 130 takes care of compressing and scaling the images to make the best use of the available bandwidth.

One of the advantages of this method of sharing, is that Person A can choose which pictures they would like to share with Person B; Person B does not have to have the entire set of images transmitted to them. Furthermore, Person A could be issued with a number of security codes protecting numerous combinations of the images found on their CD such that they can select a different combination of images to be shared with different friends and family members, as appropriate. However, as the images have to be transmitted via the Internet, some delays may occur. Nevertheless, with improvements being made to bandwidth and speed of Internet communications, it is considered that any current delays will not be significant in the near future.

Figure 13:
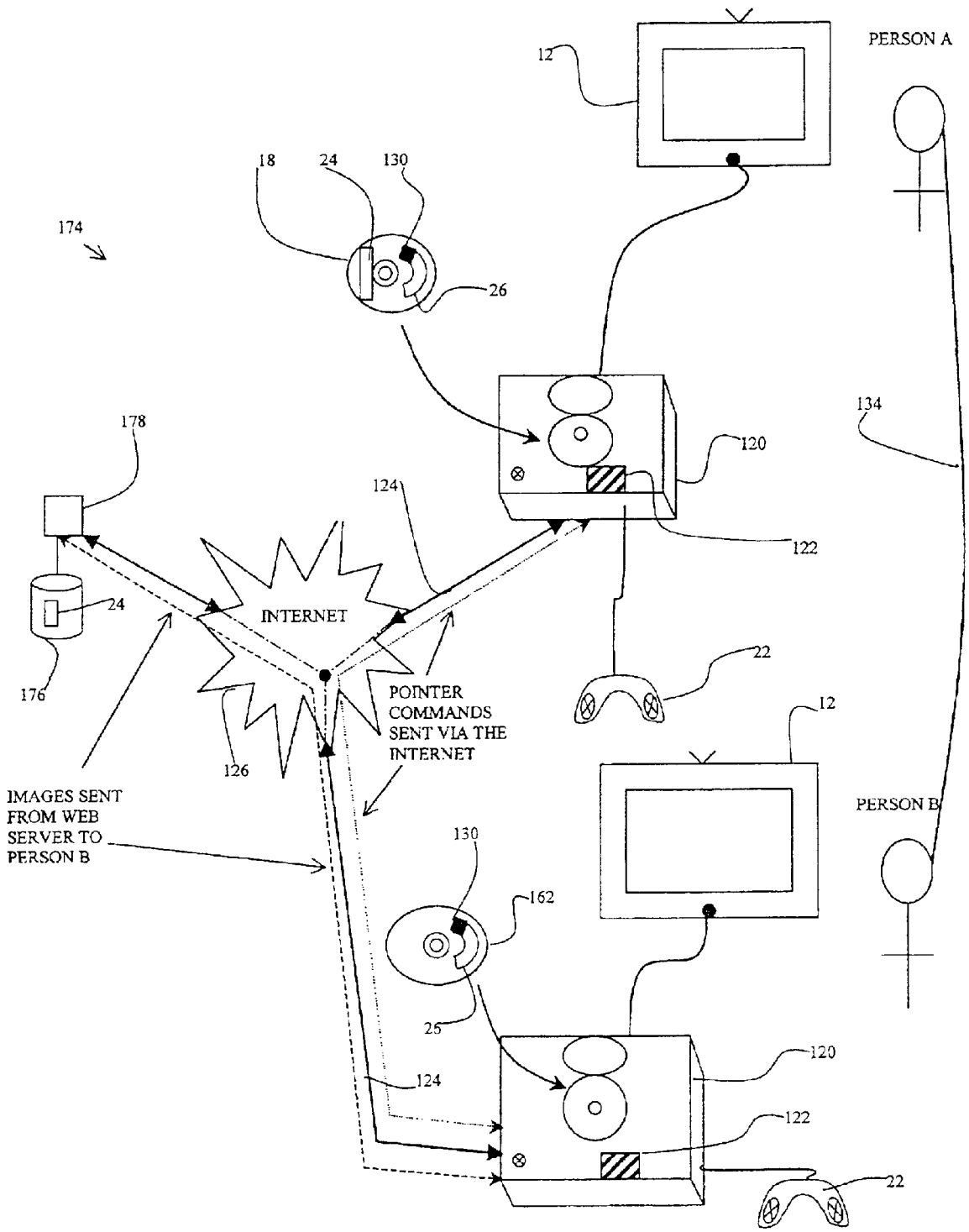
FIG. 13 is a diagrammatic representation showing a third option of how the digital photographic information of a user can be shared with a remote party using a digital imaging system according to the second embodiment of the present invention.

A third sharing option is now described with reference to FIGS. 13 and 14. The third sharing option uses a distributed system 174 which is very similar to that of the second option. However, the major physical difference between the distributed systems 160, 174 of the second and third sharing options is that in the third option, an additional copy of the user's digital photographic images 24 is stored on a database 176 which is connected via a server 178 to the Internet 126. The Internet address of the server 178 is provided in the applets 130 which are recorded in the CDs 18, 162 together with and a reference to the specific database entry where a copy of the user's image data 24 is stored. The provision of the centrally accessible copy of the user's images 24 enables Person B to obtain the image data 24 from the server 178 rather than from Person A. This can be faster than the second option as there is only one major bottleneck, at Person B's site, to negotiate in delivery of the images.

Figure 14:
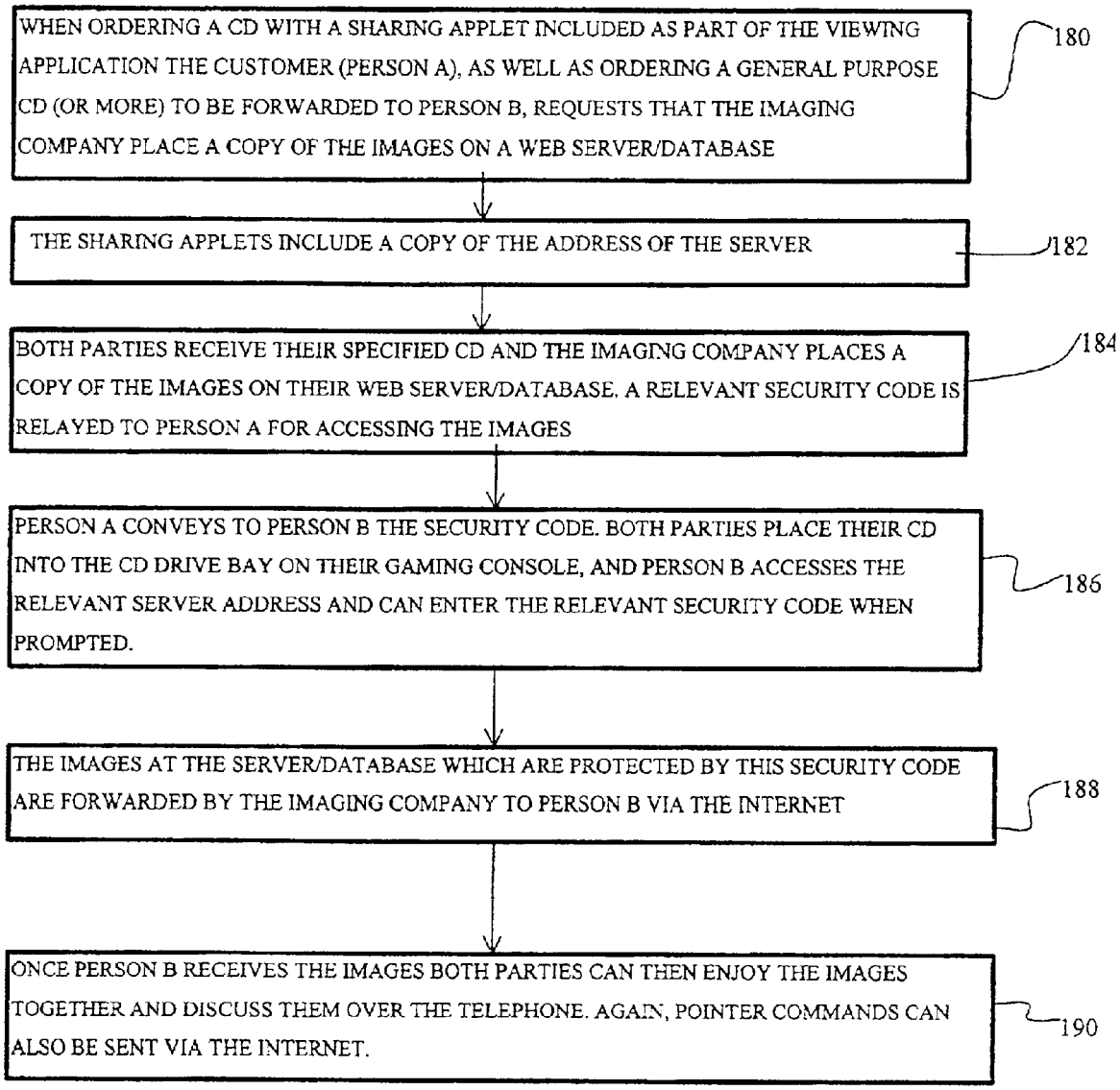
FIG. 14 is a flow diagram detailing how the sharing operation shown in FIG. 13 is achieved.

More specifically referring to FIG. 14, when Person A orders at 180 a CD 18 for viewing their digital photographic images 24, they also order another general purpose CD 162 which contains the same viewing application 26 and sharing applet 130 including at 182 the address from where the image data 24 can be accessed, but which does not contain Person A's digitised images 24. Also Person A requests at 180 that the digital imaging company places a copy of the image data 24 on their web server accessible database 176.

The imaging company places at 184 the image data 24 on the web server accessible database 176. When Person A receives at 184 their CD 18 they have a copy of the address of the server 178 in their applet 130 and are given a relevant security code for accessing the image data 24.

When Person B receives their CD 162, they contact Person A to let them know they would like to see the specified images. Person A informs at 186 Person B of the security code needed in order to access the specified image data 24. Both parties again turn on their gaming consoles 120 and televisions 12 at 186 and place their respective CDs 18, 162 in the CD drive bays 20 of their gaming consoles 120. Person B, is then required at 186 to enter the security code obtained from Person A and this is then transmitted to the server 178 together with a request for the image data 24 by Person B's sharing applet 130.

The image data 24 is forwarded at 188 from the database 176 via the server 178 and Internet 126 to Person B's gaming console 120, if the correct security code has been used. Then, as in the previously described sharing options, the applets 130 operating on Person B's gaming console 120 synchronise and copies at 190 the way in which Person A is controlling viewing of the image data 24 on their gaming console 120 such that both parties can then enjoy the images together. Pointer commands can also be sent at 190 via the Internet, between Person A and Person B, in this situation.

Another possibility with the third sharing alternative, which is not related to the remote sharing of digital images, is that Person B, having received the server address in their applet and the passcode from Person A, can then access the specified images at another time without Person A's interaction.

In an alternative to the above described options, which have access to the Internet as separate from the telephone network 134 used for aural communications between the parties, it is possible to provide all communications between the parties via the Internet 126. This would be achieved by the applets 130 being configured to support a digitised aural communications protocol such as the Voice Over Internet Protocol and the application program 26 including a standard voice digitising program. However, it would also be necessary for the gaming consoles 120 to have a microphone built-in or provided with it such that the person's voice could be recorded. The television 12 would have speakers which would convey the recorded voice to each person.

It is to be appreciated that the ability to communicate with a central server which holds a copy of the user's digital photographic images opens up further advantageous possibilities. For example, as a natural follow on to viewing the images in the comfort of the user's own home, they may then wish to order a hard copy or print of the image. This can readily be handled in a simple way by the applet 130 sending a request to the server for selected images to be printed and sent via post to the user. The address of the user and perhaps credit card details will be known to the server as the user will have already registered with the imaging company whose server is being used. Similarly, the sending of photographic images as gifts to third parties also becomes possible, with the server simply requiring notification of the address to send the prints to.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, whilst the present embodiments have been described in relation to the Internet, other wide area networks, such as an intranet for example, can also be utilised as the communication network between Person A and Person B.

What is claimed is:

1. A system for displaying a first user's personal digital photographic images, the system comprising a combination of:
   a gaming console for playing a video game for the first user, the gaming console comprising a data communications module for connecting the gaming console to a wide area network, such as the Internet;
   a domestic visual display unit operatively connected to the gaming console for displaying the video game to the first user;
   a portable digital data store configured for operation with the gaming console when operatively read by the same, the digital data store comprising the first user's digitised photographic image data and a viewing application program, the viewing application program comprising a communications program for transmitting information to a remote second user via the data communications module and the wide area network, and being arranged on operation to configure the gaming console to display the digitised photographic image data on the domestic visual display unit when the digital data store has been read by the gaming console;
   a further gaming console for playing a further video game for the second user, the further gaming console including a further data communications module operatively connecting the further gaming console to the wide area network;
   a further domestic visual display unit operatively connected to the further gaming console for displaying the further video game to the second user; and
   a further portable digital data store configured for operation with the further gaming console when operatively read by the same, the further digital data store comprising the first user's digitised photographic image data and a further viewing application program, the further viewing application program being arranged on operation to configure the further gaming console to display the digitised photographic image data on the further domestic visual display unit when the further digital data store has been read by the further gaming console, and comprising a further communications program arranged to receive sharing information from the remote first user via the further data communications module and the wide area network.

2. A system according to claim 1, wherein the sharing information comprises a pointer for display on the further domestic visual display.

3. A system according to claim 1, wherein the sharing information comprises voice over IP data.

4. A system according to claim 1, wherein the domestic visual display unit comprises a television.

5. A system according to claim 1, wherein the viewing application program is arranged to enable multiple images of the digitised photographic image data to be displayed to the user simultaneously and a gaming controller of the gaming console is arranged to enable the user to navigate though the multiple images.

6. A system according to claim 5, wherein the multiple images are in the form of thumbnail images.

7. A system according to claim 1, wherein the viewing application program comprises a plurality of user-selectable digital effects algorithms for altering the presentation of the user's digitised photographic image data on the domestic visual display unit.

8. A system according to claim 1, wherein the portable digital data store comprises a plurality of user-selectable viewing application programs, each program providing a different algorithm for displaying the user's digitised photographic image data in a different way on the domestic visual display unit.

9. A system according to claim 8, wherein each program is arranged to provide a different photo enhancement of the user's digitised photographic image data.

10. A system according to claim 1, wherein the communications program is arranged to transmit a user selection command and/or the user's digitised photographic image data to the remote party.

11. A system according to claim 1, wherein the gaming console comprises means for receiving and digitising a user's voice into voice data and the communications program is arranged to transmit the voice data over the wide area network to the remote party.

12. A system according to claim 1, wherein the communications program is arranged to implement compression of data to be transmitted and decompression of data received via the communications means.

13. A system according to claim 1, wherein the communications program comprises an applet for enabling two-way communications between the gaming console and the remote party.

14. A system according to claim 13, wherein the applet is arranged to password protect access to part or all of the data to be transmitted by the communications means with the user inputting a password associated with the data to be transmitted.

15. A system according to claim 13, wherein data received via the communications means is password protected and the applet is arranged to enable access to part or all of the received data once the user has input a correct password associated with the received data.

16. A system according to claim 1, wherein the further gaming console comprises means for receiving and digitising the third party's voice into voice data and the further communications program is arranged to transmit the voice data over the wide area network to the user.

17. A system according to claim 1, wherein the further communications program is arranged to implement compression of data to be transmitted and decompression of data received via the further communications means.

18. A system according to claim 1, wherein the further communications program comprises an applet for enabling two-way communications between the further gaming console of the remote party and the gaming console of the user.

19. A system according to claim 18, wherein received data is password protected and the applet is arranged to enable access to part or all of the received data once the remote party has input a correct password associated with the received data.

20. A system according to claim 18, further comprising a permanent data store connected to the wide area network, the permanent data store storing a copy of the user's digitised photographic image data and comprising transmission means for transmitting part or all of the user's digitised photographic image data to the remote party on receipt of a request generated by the user.

21. A system for displaying a first user's personal digital photographic images, the system comprising a combination of:
- a gaming console for playing a video game for the first user, the gaming console comprising a data communications module for connecting the console to a wide area network, such as the Internet;
- a domestic visual display unit operatively connected to the gaming console for displaying the video game to the first user;
- a portable digital data store configured for operation with the gaming console when operatively read by the same, the digital data store comprising the first user's digitised photographic image data and a viewing application program, the viewing application program comprising a communications program for transmitting information to a remote second user via the data communications module and the wide area network, and being arranged on operation to configure the gaming console to display the digitised photographic image data on the domestic visual display unit when the digital data store has been read by the gaming console;
- a further gaming console for playing a video game to the second user; the further gaming console including a further data communications module for connecting the further gaming console to the wide area network;
- a further domestic visual display unit connected to the further gaming console for displaying a video game to the second user; and
- a further portable digital data store including a further viewing application program, the further viewing application program comprising a further communications program for receiving the digitised photographic image data from the remote first user via the further data communications module and the wide area network, the further viewing application program being arranged on operation to configure the further gaming console to display the digitised photographic image data on the further domestic visual display unit when the first user's digitised photographic image data has been received by the further gaming console.

22. A system according to claim 21, wherein the further gaming console comprises means for receiving and digitising the second users voice into voice data and the further communications program is arranged to transmit the voice data over the wide area network to the remote first user.

23. A system according to claim 21, wherein the further communications program is arranged to implement compression of data to be transmitted and decompression of data received via the further data communications module.

24. A system according to claim 21, wherein the further communications program comprises an applet for enabling two-way communications between the further gaming console and the first user.

25. A system according to claim 21, wherein received data is password protected and the applet is arranged to enable access to part or all of the received data once the second user has input a correct password associated with the received data.

26. A system according to claim 21, further comprising a permanent data store connected to the wide area network, the permanent data store storing a copy of the first user's digitised photographic image data and comprising transmission means for transmitting part or all of the first user's digitised photographic image data to the second user on receipt of a request generated by the first user.

27. A system according to claim 21, wherein the domestic visual display unit comprises a television.

28. A system according to claim 21, wherein the viewing application program is arranged to enable multiple images of the digitised photographic image data to be displayed to the user simultaneously and a gaming controller of the gaming console is arranged to enable the user to navigate though the multiple images.

29. A system according to claim 28, wherein the multiple images are in the form of thumbnail images.

30. A system according to claim 21, wherein the viewing application program comprises a plurality of user-selectable digital effects algorithms for altering the presentation of the user's digitised photographic image data on the domestic visual display unit.

31. A system according to claim 21, wherein the portable digital data store comprises a plurality of user-selectable viewing application programs, each program providing a different algorithm for displaying the user's digitised photographic image data in a different way on the domestic visual display unit.

32. A system according to claim 31, wherein each program is arranged to provide a different photo enhancement of the user's digitised photographic image data.

33. A system according to claim 21, wherein the communications program is arranged to transmit a user selection command and/or the user's digitised photographic image data to the remote party.

34. A system according to claim 21, wherein the gaming console comprises means for receiving and digitising a user's voice into voice data and the communications program is arranged to transmit the voice data over the wide area network to the remote party.

35. A system according to claim 21, wherein the communications program is arranged to implement compression of data to be transmitted and decompression of data received via the communications means.

36. A system according to claim 21, wherein the communications program comprises an applet for enabling two-way communications between the gaming console and the remote party.

37. A system according to claim 36, wherein the applet is arranged to password protect access to part or all of the data to be transmitted by the communications means with the user inputting a password associated with the data to be transmitted.

38. A system according to claim 36, wherein data received via the communications means is password protected and the applet is arranged to enable access to part or all of the received data once the user has input a correct password associated with the received data.

39. A system according to claim 21, wherein the sharing information comprises a pointer for display on the further domestic visual display.

40. A system according to claim 21, wherein the sharing information comprises voice over IP data.

* * * * *